(12) United States Patent
Pine

(10) Patent No.: US 8,441,787 B2
(45) Date of Patent: May 14, 2013

(54) EZCONNECT TABLET/STYLUS PC PORTABLE DOCKING ACCESSORY WITH I/O PORTS

(75) Inventor: Jerrold Scott Pine, Boca Raton, FL (US)

(73) Assignee: Man & Machine Inc., Landover, MD (US)

( * ) Notice: Subject to any disclaimer, the term of this patent is extended or adjusted under 35 U.S.C. 154(b) by 324 days.

(21) Appl. No.: 12/961,973

(22) Filed: Dec. 7, 2010

(65) Prior Publication Data
US 2011/0134600 A1    Jun. 9, 2011

Related U.S. Application Data

(60) Provisional application No. 61/267,881, filed on Dec. 9, 2009.

(51) Int. Cl.
*G06F 1/16* (2006.01)

(52) U.S. Cl.
USPC .................. 361/679.41; 455/556.1; 715/773; 345/179

(58) Field of Classification Search .................. 345/619, 345/629, 1.3, 2.3, 174, 522, 87, 179, 420, 345/156, 633, 163; 361/679.55, 679.41, 361/679.43, 679.37, 679.39, 679.09, 679.32, 361/679.21, 679.27, 679.02, 679.08, 679.22, 361/679.4, 679.26, 679.56, 679.31, 679.15; 312/249.1, 249.8, 223.1, 223.2; 16/436, 16/370; 455/420, 127.1, 466, 456.1, 456.2, 455/411, 436, 465, 556.1; 715/781, 764, 715/783, 773, 777, 201
See application file for complete search history.

(56) References Cited

U.S. PATENT DOCUMENTS

| | | | | |
|---|---|---|---|---|
| 7,298,611 | B1 * | 11/2007 | Carnevali | 361/679.55 |
| 7,940,522 | B2 * | 5/2011 | Solomon et al. | 361/679.41 |
| 2009/0213536 | A1 * | 8/2009 | Lewandowski et al. | 361/679.43 |

\* cited by examiner

*Primary Examiner* — Hung Duong

(57) ABSTRACT

A portable docking accessory that contains an attachably detachable mechanically rigid means for providing a Tablet Pc user a host of I/O interconnect solutions that allows continuous mobile use in an ergonomic and aesthetically appropriate form factor.

17 Claims, 8 Drawing Sheets

EZCONNECT TABLET/STYLUS PC PORTABLE DOCKING ACCESSORY WITH I/O PORTS

RELATED US PATENT APPLICATIONS

The application is related to Provisional Application 61/267,881 filed on Dec. 9, 2009 which is incorporated by reference herein.

FIELD OF THE INVENTION

The invention relates to a portable docking accessory for Tablet personal computers.

BACKGROUND OF THE INVENTION

As portable computing devices become increasingly smaller and light weight, fewer I/O ports such as usb, firewire, audio, video, and ethernet are incorporated directly into the device. This is especially true for Tablet/stylus PCs which traditionally incorporate a 15-50 pin plane target connector along the bottom edge of the PC that mates with a spring pin connector located in a desktop docking station for I/O access. The desktop docking station typically charges the device and contains a host of I/O ports with their industry standard connectors. Many tablet PCs may contain at least one usb port which can act as many other I/O interface types with an adapter, for example a usb to ethernet adapter. While the usb port can serve as practically any other I/O type, usb type A and Type B connectors have poor mechanical characteristics with no strain relief and may be easily dislodged during portable operation. When a tablet PC is used as intended for Point of Sale applications at retail or for industrial environment computing, portability is key and poorly attached electrical peripherals can be extremely limiting for mobility and use. Desktop docking provides a host of reliable I/O interconnect options, but again limits the mobility and use of the PC for environments that it was intended for.

What is desired is a portable docking accessory that contains an attachably detachable mechanically rigid means for providing a Tablet Pc user a host of I/O interconnect solutions that allows continuous mobile use in an ergonomic and aesthetically appropriate form factor.

SUMMARY OF THE PRESENT INVENTION

A first aspect of the present invention is the blind alignment of a plane target connector along the bottom edge of a Tablet PC with a spring pin connector contained within the portable docking accessory.

Yet, another aspect is an attachably detachable mechanically rigid means to engage a portable docking accessory to a tablet PC without the use of screw fasteners.

Yet, another aspect is coupling locating pins with fasteners directly to a PCB, coupling the PCB with fasteners to the plastic housing, engaging said locating pins with mating holes in a tablet PC, engaging the plastic housing to the tablet PC at an orientation normal to the axis of the locating pins, and using the PCB as a torsion spring to maintain coupling force in the system.

Yet, another aspect is a Printed circuit board that provides voltage regulation from PC battery voltage levels to I/O levels, fuse protection to PC, ESD protection to PC, and routing from the spring pin connector to the industry standard connector(s) for I/O.

Yet, another aspect is a plastic housing whose material and cross section achieves a UL V0 fire rating.

Yet, another aspect is to maintain the tablet PC aesthetics by contouring the portable docking accessory with the same profile as the PC.

Yet, another aspect is to embed GPS circuitry within the portable docking accessory for location finding utility.

Yet, another aspect is to embed a magnetic stripe read head within the portable docking accessory for card reader utility.

Yet, another aspect is to embed audio circuitry within the portable docking accessory for headphone and microphone utility.

Yet, another aspect is to embed video circuitry within the portable docking accessory for video input and or video output utility.

Yet, another aspect is to embed a keypad and keypad circuitry within the portable docking accessory for pin code entry for Point of Sale utility.

Yet, another aspect is to embed ethernet circuitry within the portable docking accessory for networking utility.

Yet, another aspect is to embed usb circuitry within the portable docking accessory for general I/O utility.

Yet, another aspect is to embed firewire circuitry within the portable docking accessory for general I/O utility.

Yet, another aspect is to embed Smartcard circuitry within the portable docking accessory for smartcard utility.

Yet, another aspect is to embed biometric ID circuitry within the portable docking accessory for secure access utility.

Yet, another aspect is to embed IR emitters/detector circuitry within the portable docking accessory for IR I/O functionality.

Yet, another aspect is to embed fiber optic communication circuitry within the portable docking accessory for Fiber Optic communications and I/O.

Yet, another aspect is to embed serial port communications circuitry within the portable docking accessory for serial communications.

Yet, another aspect is to embed parallel port communications circuitry within the portable docking accessory for parallel communications.

Yet, another aspect is to embed RF ID circuitry within the portable docking accessory for remote ID and tracking capabilities.

Yet, another aspect is to embed barcode reading circuitry within the portable docking accessory for barcode reader functionality.

BRIEF DESCRIPTION OF THE DRAWINGS

For the purpose of initially illustrating the invention, the specification presents drawings and embodiments that are presently preferred as well as alternates. It should be understood, however, that the invention is not limited to the specific instrumentality and methods disclosed herein. It can be recognized that the figures represent a layout in which persons skilled in the art may make variations therein. In the drawings.

DETAILED DESCRIPTION OF THE DRAWING

Figure 1:
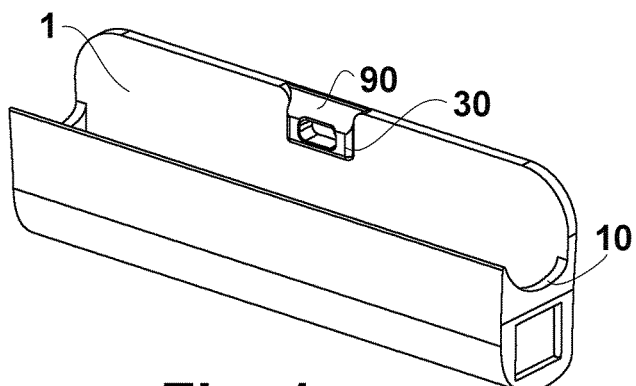
FIG. 1 illustrates a perspective view of a portable docking accessory.
Figure 2:
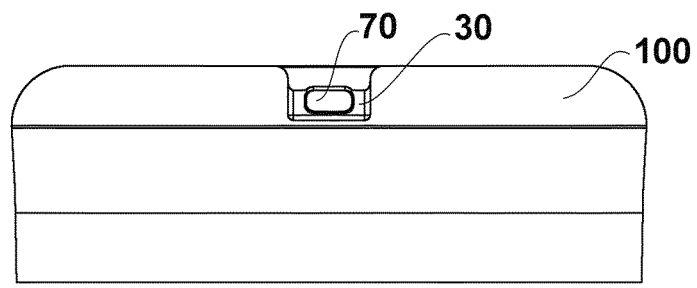
FIG. 2 illustrates a front view of said portable docking accessory.
Figure 3:
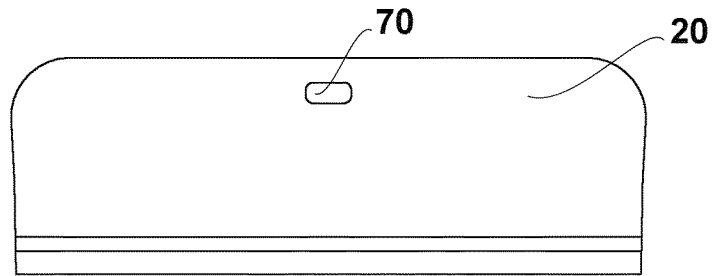
FIG. 3 illustrates a rear view of said portable docking accessory.

FIGS. 1 through 5 present a multitude of views of a housing for the portable docking accessory. The housing 1 contains key features to facilitate an attachably detachable mechanically rigid means to engage it to a tablet PC without the use of screw fasteners. The first feature is the contoured radius 10 which has an identical contour to the bottom edge contour 110 on tablet PC 101. The matching contours maintain back surface 20 in a parallel alignment with the back surface 50 of the tablet PC illustrated in FIG. 14 as they engage. Another feature of the housing 1 is the contoured protrusion 30 which is captured by a recessed channel 60 in FIG. 14. The engagement of protrusion 30 with recessed channel 60 helps prevent rotational torque of housing 1. Contained within protrusion 30 is hole 70 that is essentially the same shape and is fractionally larger in diameter then protrusion 80 in FIG. 14. When the portable docking accessory housing 1 is engaged with tablet PC 101, the protrusion 80 nests within hole 70 under tension and creates a latching mechanism for attaching the portable docking accessory to the tablet PC 101. The surface draft 90 on protrusion 30 starts at the leading edge on hole 70 and terminates at the edge of the housing 1. This surface draft 90 serves two purposes. The first purpose is to raise the tongue surface 100 containing protrusion 30 over protrusion 80 as the portable docking accessory housing 1 is engaged in a sliding motion with tablet PC 101. The housing is made out of Sabic Plastic Cycoloy resin which is a combination of ABS and PC. The plastic is generally rigid but has a sufficient Modulus of elasticity to deform tongue surface 100 as it slides over protrusion 80 then returns to an un-deformed state to capture protrusion 80 within hole 70 as the two align themselves. The second function of surface draft 90 is to allow the tip of a finger to wedge beneath protrusion 30 to lift and disengage tongue 100 from protrusion 80 and slide portable docking accessory housing 1 off of tablet PC 101.

Figure 4:
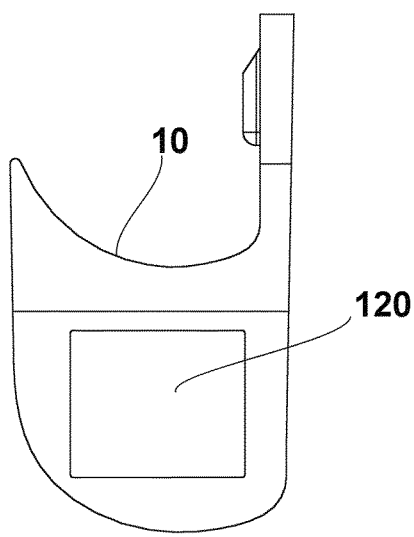
FIG. 4 illustrates a right side view of said portable docking accessory.
Figure 5:
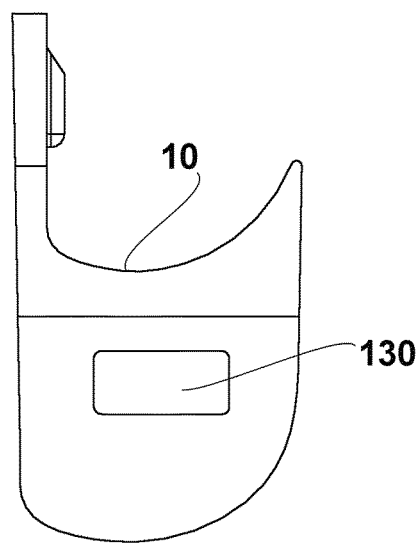
FIG. 5 illustrates a left side view of said portable docking accessory.
Figure 6:
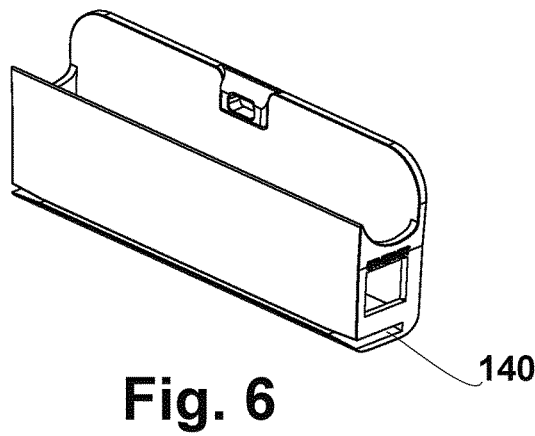
FIG. 6 illustrates a perspective view of a portable docking accessory with magnetic stripe reader.
Figure 7:
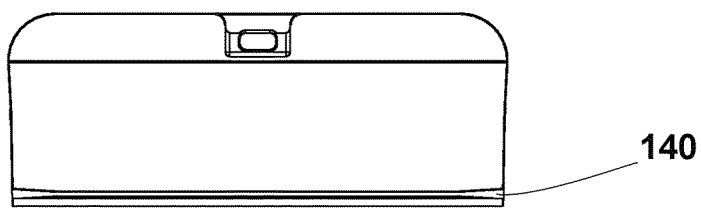
FIG. 7 illustrates a front view of said portable docking accessory with magnetic stripe reader.
Figure 8:
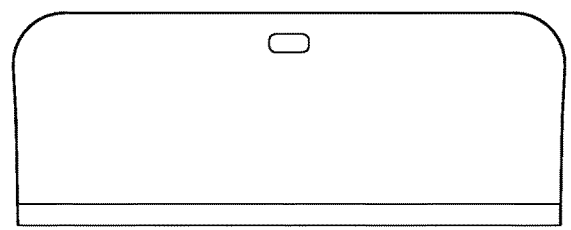
FIG. 8 illustrates a rear view of said portable docking accessory with magnetic stripe reader.
Figure 9:
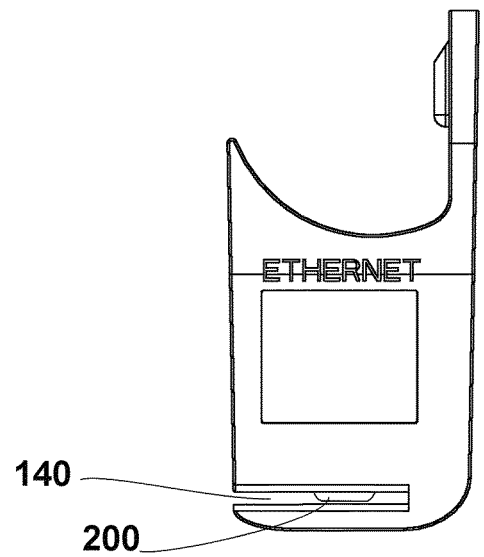
FIG. 9 illustrates a left side view of said portable docking accessory with magnetic stripe reader.
Figure 10:
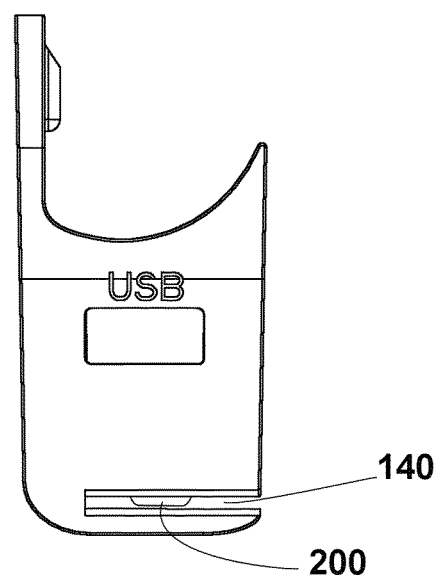
FIG. 10 illustrates a right side view of said portable docking accessory with magnetic stripe reader.

FIGS. 4 and 5 illustrate side views of the portable docking accessory housing 1. On the side views, Ethernet hole 120 and USB hole 130 are cutouts in the plastic to allow Ethernet and USB connectors to reside flush with the external surface of housing 1 for connecting USB and Ethernet to the tablet PC 101. It can be appreciated that the holes can be configured to accommodate any I/O connector including but not limited to a parallel port, serial port, firewire, audio in/out, video composite in/out, video RGB in/out, IR, and fiber optics.

FIGS. 6 through 10 present a multitude of views of a housing for the portable docking accessory that includes features for a magnetic card reader. In this embodiment the portable docking accessory housing 1 includes a slot 140 to guide a credit card or other magnetically encoded card containing a magnetic stripe. The housing contains circuitry and a magnetic read head 200 aligned in proper registration with the card slot to read 1, 2, or 3 tracks on the magnetic stripe. The read head 200 can be prepackaged with a head and circuitry mounted on a butterfly spring ready for mounting to a plastic housing, not illustrated. An example of the read head assembly is the Intellihead 21030006 by Magtek of Seal beach, Calif.

Figure 11:
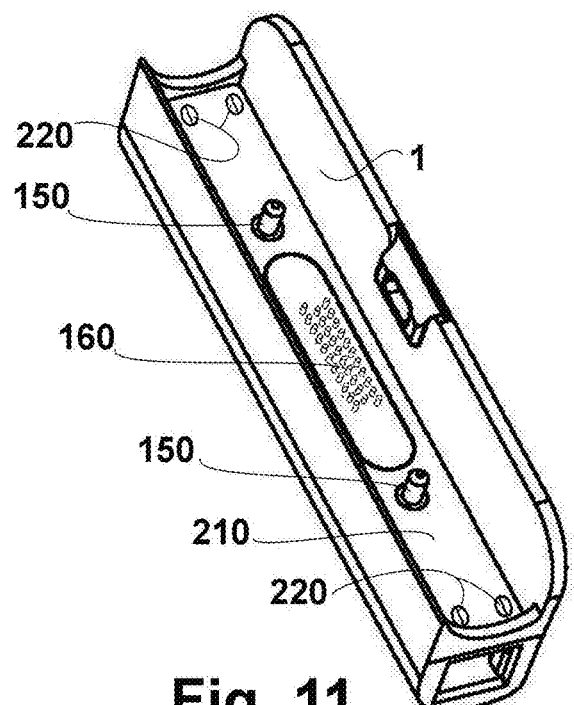
FIG. 11 illustrates a perspective view of said portable docking accessory with locating pins and spring pin connector.

FIG. 11 illustrates printed circuit board 210 within portable docking accessory 1. On the top side of printed circuit board 210 are two locating pins 150. The locating pins are fabricated out of steel or any other hard metal. The locating pins 150 have a threaded hole through the bottom surface of the pin along its axis 0.5 inches deep. There are clearance holes through printed circuit board 210 where the locating pins 150 are to be aligned. A threaded fastener such as a 6-32×⅜ long pan head screw (not illustrated) attaches the locating pins 150 from the bottom side of printed circuit board 210. Four additional threaded fasteners 220 attach circuit board 210 to the portable docking accessory 1 plastic housing. In the center of the top surface of printed circuit board 210 is a spring pin electrical connector 160. The spring pin electrical connector 160 contains an array of electrical contacts that are positioned in a fixed matrix with known spacing. Connector 160 is oriented in a specific alignment with the locating pins 150 such that the center of each electrical interconnect will mate with the center of pads on a plane target connector with pads located in an identical matrix configuration and oriented with holes designed to receive the locating pins 150.

Figure 12:
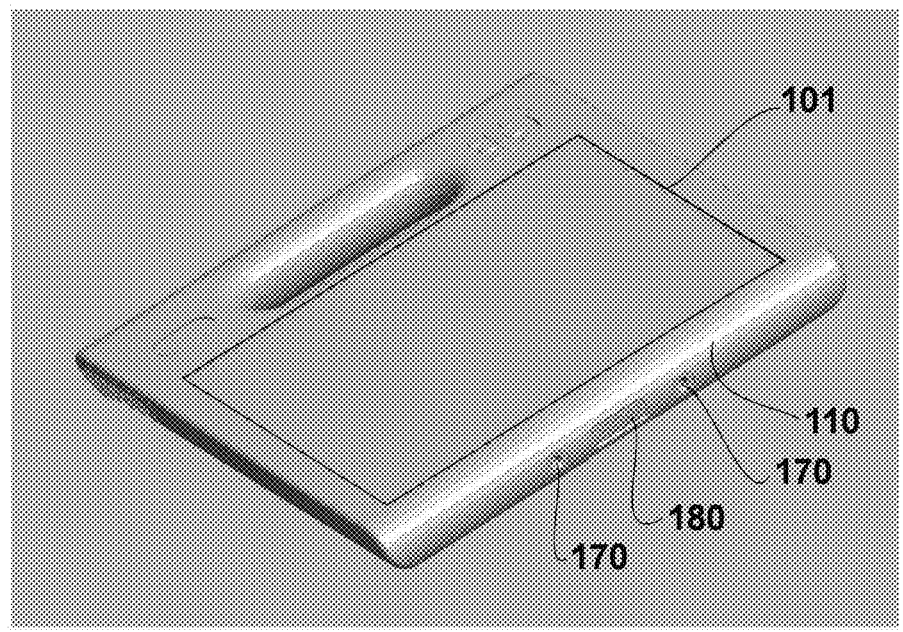
FIG. 12 illustrates a perspective view of a typical tablet pc manufactured by motion computing.
Figure 13:
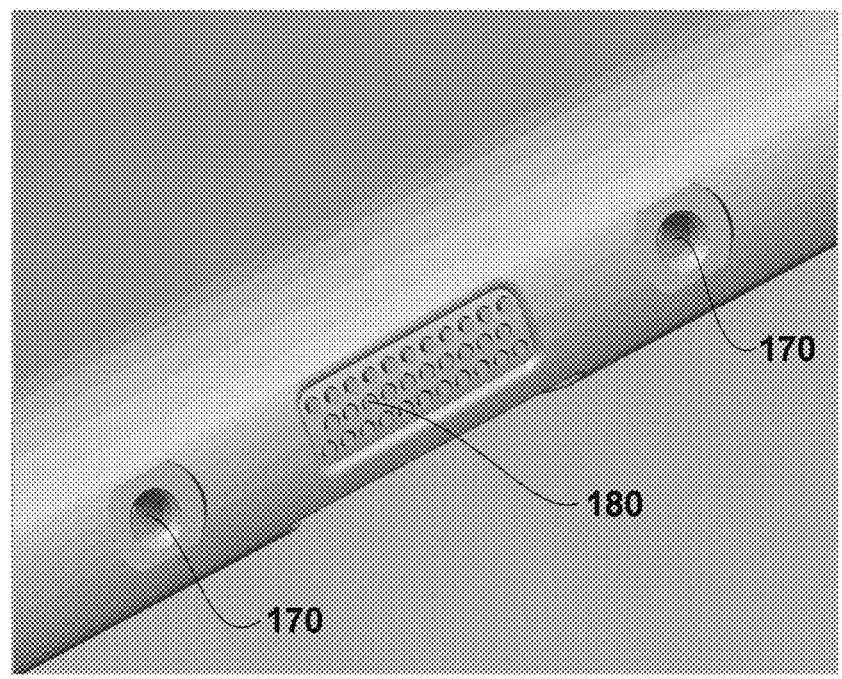
FIG. 13 illustrates a perspective view of the bottom edge of the tablet pc manufactured by motion computing illustrating the I/O connection.
Figure 14:
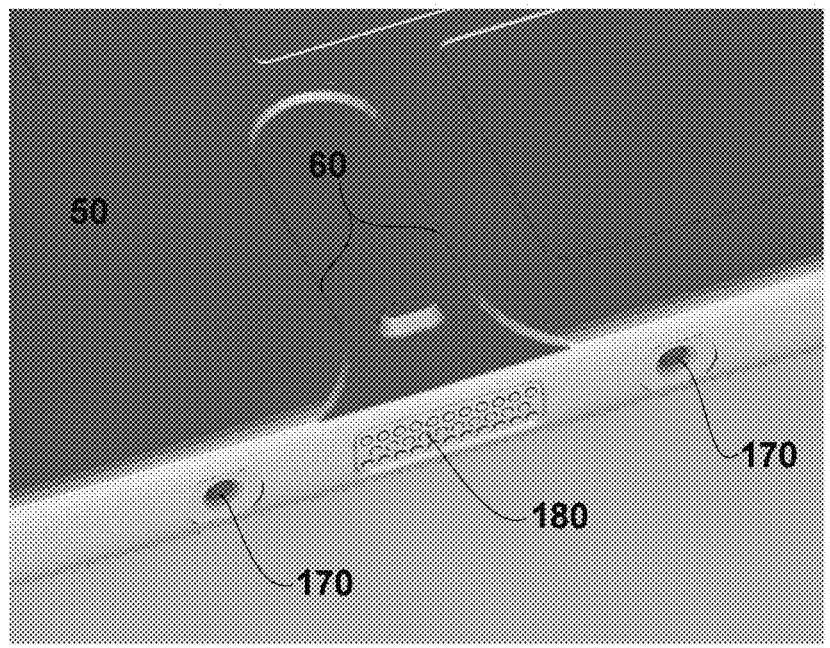
FIG. 14 illustrates a perspective view of the back and bottom edge of the tablet pc manufactured by motion computing illustrating the I/O connection.

FIGS. 12, 13, and 14 are perspective drawings of tablet PC 101. The tablet PC 101 illustrated is a model C5/F5 from Motion Computing of Austin, Tex. The devices are designed to operate in a rugged environment and have a host of built-in peripherals for industry specific use. All of the Standard computer I/O such as USB, Ethernet, and VGA ports are only accessible using a desktop docking system. The electrical interface between the dock and the tablet PC 101 is a plane target connector 180 located on the bottom edge of the tablet PC 101. Along the same bottom edge are two locating holes 170 that straddle the connector. Connector 180 is oriented in a specific alignment with the locating holes 170 such that the center of each electrical interconnect will mate with the center of pins on a spring pin electrical connector with pins located in an identical matrix configuration and oriented with locating pins designed to mate in locating holes 170. The back surface 50 of tablet PC 101 contains channel 60 and protrusion 80 which are features used to interlock the PC and the desktop docking station.

Figure 15:
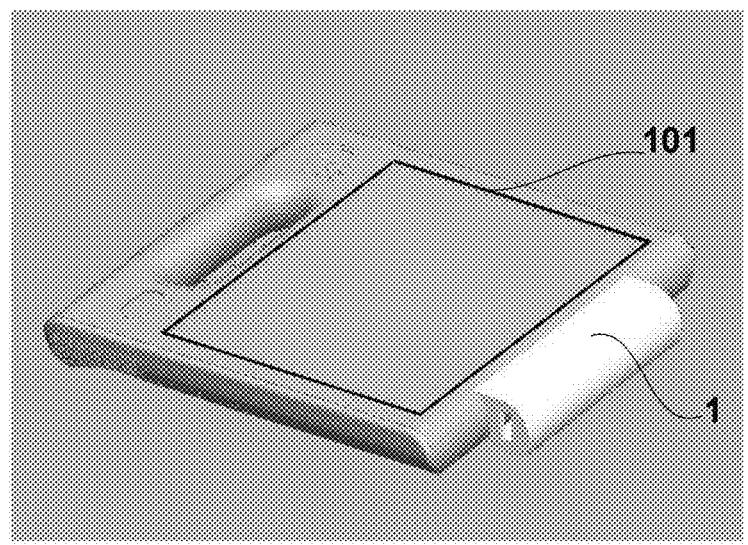
FIG. 15 illustrates a top perspective view of said portable docking accessory attached the tablet pc manufactured by Motion Computing.
Figure 16:
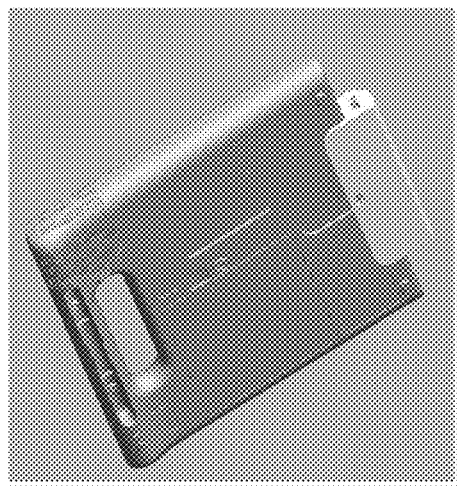
FIG. 16 illustrates a bottom perspective view of said portable docking accessory attached the tablet pc manufactured by Motion Computing.
Figure 17:
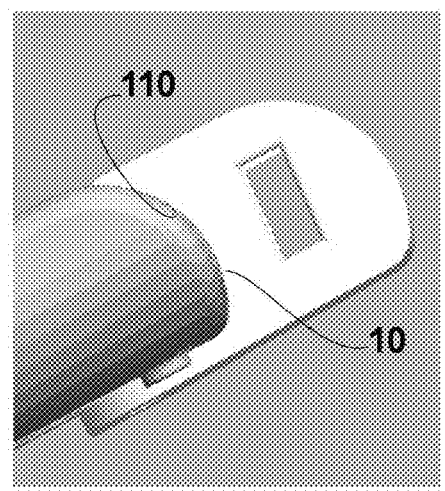
FIG. 17 illustrates a side perspective view of said portable docking accessory attached the tablet pc manufactured by Motion Computing.

FIGS. 15, 16, and 17 are perspective views showing the portable docking accessory engaged with the tablet PC 101.

FIG. 17 illustrates how the contoured radius 10 on housing 1 and the bottom edge contour 110 form an intimate fit that helps maintain overall mechanical integrity.

Figure 18:
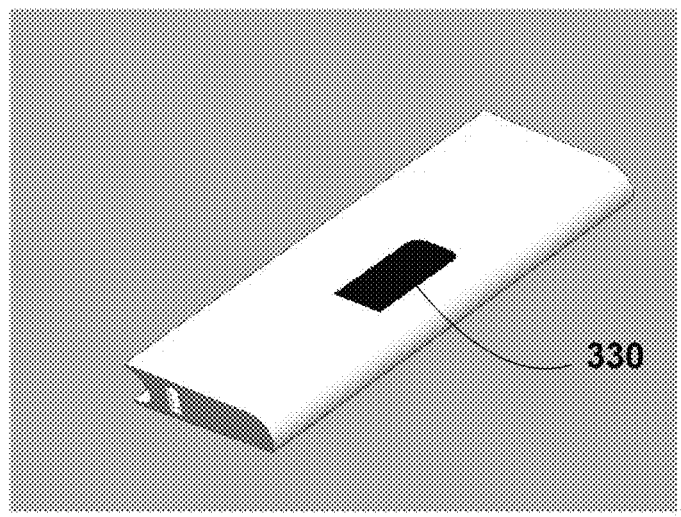
FIG. 18 illustrates a top perspective view of said portable docking accessory with embedded GPS.

FIG. 18 is a perspective view showing the portable docking accessory with integrated GPS. GPS unit 330 is shown protruding through a hole in housing 1. The GPS unit may be a completely integrated module including circuitry and GPS antenna. It communicates it data through the portable docking accessory using a USB port.

The applicant has provided a method and apparatus, with several options, for creating and using said resistance band coupling footwear. Although the apparatus and methods taught herein are the preferred and alternate embodiments, it can be recognized that other form factors, materials, and methods of achieving the same results can be contrived from the disclosed teachings.

What is claimed is:

1. A portable I/O docking accessory that allows continuous mobile use in an ergonomic and aesthetically pleasing form factor for a tablet PC comprising:
    a plastic housing;
    a printed circuit board with circuitry;
    an alignment means to mate said portable I/O docking accessory to a tablet PC;
    an attachably detachable mechanically rigid coupling means to engage a portable docking accessory to a tablet PC without fasteners;
    said alignment means creates the blind alignment of a plane target connector along the bottom edge of a Tablet PC with a spring pin connector contained on said printed circuit board with circuitry;
    said alignment means comprises locating pins, adjacent to said spring pin connector, said locating pins are directly fastened with fasteners to said printed circuit board, said printed circuit board is fastened directly with fasteners to said plastic housing;
    coupling of said portable I/O docking accessory with said tablet PC requires insertion of said locating pins with mating holes in said tablet PC;
    the latching mechanism of said portable I/O docking accessory with said tablet PC requires engagement of a hole on a cantilevered protrusion that is located on said plastic housing with a mating pin of similar shape and size on the tablet PC;
    said cantilevered protrusion on said plastic housing is at an planar orientation normal to the axis of said locating pins and uses said printed circuit board as a torsion spring to maintain coupling force between the locating pins on the portable I/O docking accessory and the locating pin on the tablet PC;
    said cantilevered protrusion on said plastic housing further mates with a recessed channel on said tablet PC to prevent rotational torque of housing;
    Top and Bottom Contours of said plastic housing mimic mating contours on said tablet PC to further align said housing with said tablet PC;
    Said printed circuit board provides voltage regulation from PC battery voltage levels to I/O levels, fuse protection to PC, ESD protection to PC, and routing from the spring pin connector to the industry standard connector(s) for I/O.

2. A printed circuit board with circuitry as recited in claim 1, wherein the circuitry further includes GPS circuitry for location finding utility.

3. A printed circuit board with circuitry as recited in claim 1, wherein the circuitry further includes a magnetic stripe read head for card reader utility.

4. A printed circuit board with circuitry as recited in claim 1, wherein the circuitry further includes audio circuitry for headphone and microphone utility.

5. A printed circuit board with circuitry as recited in claim 1, wherein the circuitry further includes video circuitry for video input and or video output utility.

6. A printed circuit board with circuitry as recited in claim 1, wherein the circuitry further includes an embedded keypad and keypad circuitry for pin code entry for Point of Sale utility.

7. A printed circuit board with circuitry as recited in claim 1, wherein the circuitry further includes Ethernet circuitry for networking utility.

8. A printed circuit board with circuitry as recited in claim 1, wherein the circuitry further includes usb circuitry for general I/O utility.

9. A printed circuit board with circuitry as recited in claim 1, wherein the circuitry further includes Firewire circuitry for general I/O utility.

10. A printed circuit board with circuitry as recited in claim 1, wherein the circuitry further includes Smartcard reader/writer circuitry for Smartcard utility.

11. A printed circuit board with circuitry as recited in claim 1, wherein the circuitry further includes biometric ID circuitry for secure access utility.

12. A printed circuit board with circuitry as recited in claim 1, wherein the circuitry further includes IR emitters/detector circuitry for IR I/O functionality.

13. A printed circuit board with circuitry as recited in claim 1, wherein the circuitry further includes serial port communications circuitry for serial data communications.

14. A printed circuit board with circuitry as recited in claim 1, wherein the circuitry further includes fiber optic communication circuitry for Fiber Optic communications and I/O.

15. A printed circuit board with circuitry as recited in claim 1, wherein the circuitry further includes parallel port communications circuitry for parallel communications.

16. A printed circuit board with circuitry as recited in claim 1, wherein the circuitry further includes RF ID circuitry for remote ID and tracking capabilities.

17. A printed circuit board with circuitry as recited in claim 1, wherein the circuitry further includes barcode reading circuitry for barcode reader functionality.

* * * * *